(12) United States Patent
Agnello

(10) Patent No.: US 8,141,740 B2
(45) Date of Patent: Mar. 27, 2012

(54) PORTABLE CONTAINER

(76) Inventor: Patricia Agnello, Saugus, MA (US)

( * ) Notice: Subject to any disclaimer, the term of this patent is extended or adjusted under 35 U.S.C. 154(b) by 287 days.

(21) Appl. No.: 10/926,938

(22) Filed: Aug. 26, 2004

(65) Prior Publication Data

US 2006/0054622 A1 Mar. 16, 2006

(51) Int. Cl.
*A47J 39/00* (2006.01)
*B65D 1/40* (2006.01)
*B65D 3/22* (2006.01)

(52) U.S. Cl. ............... 220/592.17; 220/62.15; 220/62.18

(58) Field of Classification Search ............... 220/23.87, 220/592.23, 592.17, 592.2, 592.27, 62.15, 220/62.18
See application file for complete search history.

(56) References Cited

U.S. PATENT DOCUMENTS

| | | | | |
|---|---|---|---|---|
| 1,009,406 A | * | 11/1911 | graham | 220/592.17 |
| 2,660,039 A | * | 11/1953 | Newell | 215/377 |
| 2,895,636 A | * | 7/1959 | Martin | 220/574 |
| 3,002,646 A | * | 10/1961 | Lewis | 220/62.11 |
| 3,384,508 A | * | 5/1968 | Bopp et al. | 428/332 |
| 3,596,795 A | * | 8/1971 | D'Ercoli | 206/514 |
| D231,068 S | * | 4/1974 | Douglas | D7/533 |
| 3,810,557 A | * | 5/1974 | Cline | 215/12.1 |
| 4,548,348 A | * | 10/1985 | Clements | 220/738 |
| 4,928,412 A | * | 5/1990 | Nishiyama | 40/324 |
| 4,928,848 A | * | 5/1990 | Ballway | 220/23.87 |
| 6,260,727 B1 | * | 7/2001 | Durdon | 220/254.3 |
| 6,352,168 B1 | * | 3/2002 | Lin | 220/592.17 |
| 6,528,105 B1 | * | 3/2003 | Gerhart et al. | 426/394 |
| 2002/0162845 A1 | * | 11/2002 | Yeh | 220/625 |
| 2004/0159649 A1 | * | 8/2004 | Li | 219/436 |

* cited by examiner

*Primary Examiner* — Mickey Yu
*Assistant Examiner* — Shawn Braden
(74) *Attorney, Agent, or Firm* — Mintz Levin Cohn Ferris Glovsky and Popeo, P.C.; Matthew Pavao, Esq.; Katherine J. Miller

(57) ABSTRACT

A portable container system having a container body, including an external housing of a durable material and an internal liner constructed of a crystalline ceramic material is provided. A portion of the internal liner extends above the external housing through an open-ended housing cavity.

13 Claims, 6 Drawing Sheets

PORTABLE CONTAINER

BACKGROUND OF THE INVENTION

Consuming beverages is both a social activity and a necessity. In today's fast-paced society, drinking should minimally impose on a consumer's schedule or mobility. Accommodating this desire, a vast array of paraphernalia has been developed to foster beverage portability while frequently sacrificing sensory stimulation such as taste, temperature and texture.

SUMMARY OF THE INVENTION

In one aspect, the invention provides a portable container system including a container body. The container body includes an external housing having an inner surface and an outer surface and constructed of a durable material. The external housing defines an open-ended housing cavity. The container body also includes an internal liner having an inner surface and an outer surface and constructed of a crystalline ceramic material. The internal liner defines an open-ended liner cavity and is partially disposed in the open-ended housing cavity such that at least a portion of the internal liner extends above the external housing through the open-ended housing cavity.

In one embodiment, the internal liner extends above the external housing by a distance allowing a person's lips to contact the liner without contacting the external housing. For example, this distance can less than about 25 mm. In some instances, crystalline ceramic material is porcelain.

In some embodiments, the external housing defines an interior diameter that decreases along a direction from a top of the external housing towards a bottom of the external housing. The internal liner can also define an exterior diameter that decreases along a direction from a top of the external housing towards a bottom of the external housing. The exterior diameter of the internal liner can be less than the internal diameter of the external housing such that a cavity is defined between an inside surface of the external housing and an outside surface of the internal liner. In some instances, this cavity is air-filled. In some instances, the cavity contains an impact-absorbing material.

In another aspect, the invention provides a portable container system including a containing means for containing a liquid constructed of a material and defining an open-ended liner cavity. The material provides enhanced thermoinsulation and is substantially chemically inert. The container system also includes a protecting means for protecting the containing means. This protecting means includes a durable material and defines an open-ended housing cavity. The container system also includes a sealing means releasably coupled to the protecting means. The containing means is partially disposed in the protecting means such that at least a portion of the containing means extends above the protecting means.

In another aspect, the invention provides a portable container system including a frustoconical container body, a lid and a handle. The frustoconical container body includes an external housing of a durable material and defining an open-ended housing cavity. The open-ended housing cavity has a diameter that decreases along a direction from the top of the external housing towards the bottom of the external housing. The internal liner is constructed of a crystalline ceramic material defining an open-ended liner cavity, wherein the open-ended liner cavity has a diameter that decreases along a direction from the top of the internal liner towards the bottom. The internal liner is partially disposed in the open-ended housing cavity such that at least a portion of the internal liner extends above the external housing through the open-ended housing cavity. A lid is releasably coupled to the frustoconical container body. The lid includes an aperture and a foldable tab coupled to the lid. The foldable tab optionally covers the aperture. The handle is coupled to the external housing.

Various aspects of the invention may provide one or more of the following capabilities. A cup or other beverage container can be durable, can be substantially chemically inert and/or can provide good insulation properties. Temperature and flavor of a container's contents may be maintained better than prior containers. A substantially chemically inert, physically pleasing portion of a container can be provided for contact with a consumer's mouth. Drinks may be transported and drunk in an impact-resistant container, with less container-affected flavor than previous impact-resistant containers. Breakage or fracturing of a ceramic container can be reduced. Benefits of ceramic containers can be provided with reduced limitations normally associated with such materials. These and other capabilities of the invention, along with the invention itself, will be more fully understood after a review of the following figures, detailed description, and claims.

BRIEF DESCRIPTIONS OF THE FIGURES

DETAILED DESCRIPTION OF PREFERRED EMBODIMENTS

Embodiments of the invention provide durable containers that reduce temperature change of the contents and do not substantially affect the flavor of contained liquids. Exemplary containers include container bodies having an internal liner that is protected by an external housing. The internal liner is constructed of a material suitable for thermally insulating contents held within the container body while also inhibiting chemical interactions between the internal liner and the contents, which can affect the flavor of the contents. The external housing is constructed of a durable material suitable for helping to protect, and to increase the impact resistance of, the internal liner. The internal liner can be constructed of one or more crystalline ceramics.

Container systems can include lids and one or more handles preferably affixed to the external housing. The container system can be a variety of configurations and sizes. Container systems according to the invention can be various sizes and/or shapes for various uses, e.g., as a beverage cup or a portable beverage container suitable for consuming beverages while traveling. Other embodiments are within the scope of the invention.

Figure 1:
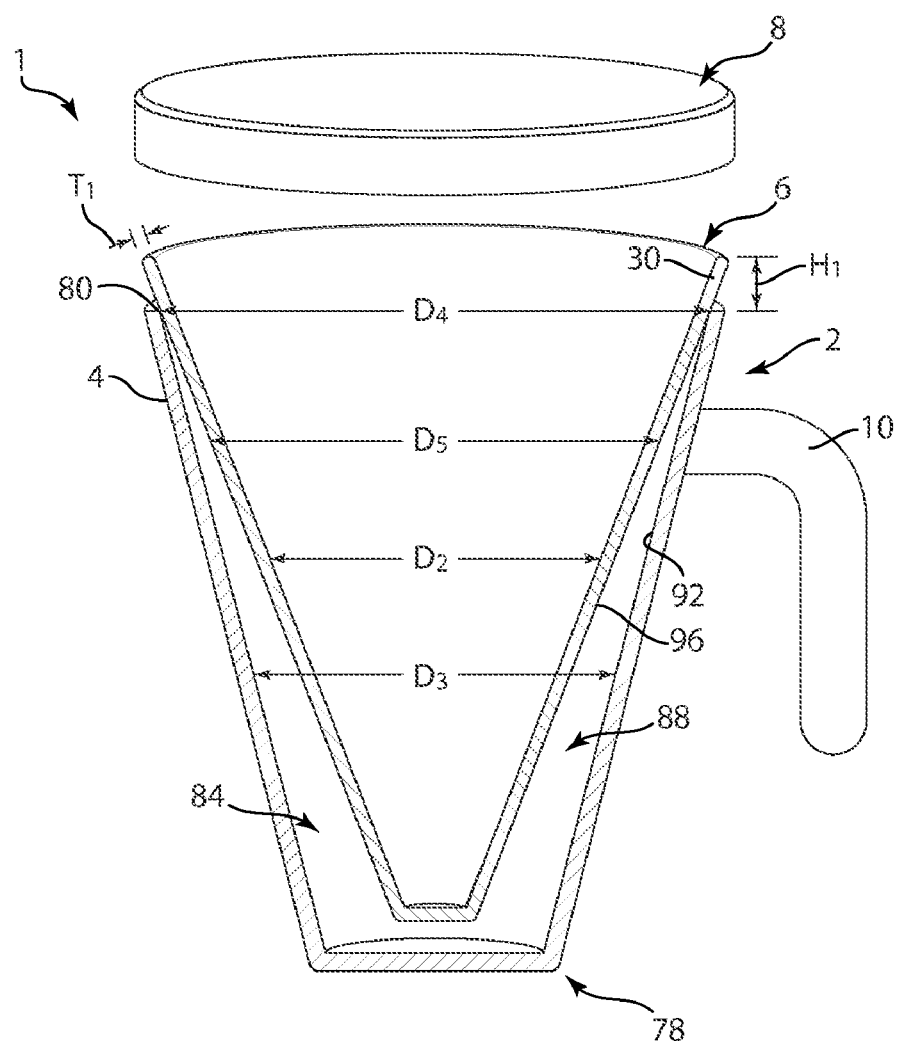
FIG. 1 is a cross-sectional view of a container system according to the invention.

Referring to FIG. 1, a container system 1 includes a container body 2 and a lid 8. The container body 2 includes a crystalline ceramic internal liner 6, an external housing 4, and a handle 10 attached to the external housing 4. While only one handle 10 is shown, other quantities of handles (e.g., 0, 2, etc.) are acceptable.

The internal liner 6 is disposed within the external housing 4 in a manner such that at least an upper portion 30 of the internal liner 6 extends above the external housing 4 to expose the upper portion 30 when the lid 8 is detached from the container body 2. The exposed upper portion 30 of the internal liner 6 helps to reduce effects on the flavor of the contents that can result from an interaction between the contents and other material. The exposed upper portion 30 enhances the sensory enjoyment of contacting the container with a consumer's mouth. For example, the exposed upper portion 30 can be smoother than commonly implemented materials such as plastic and glass.

The upper portion 30 of the internal liner 6 preferably has a height $H_1$ from about 5 mm to about 25 mm. Preferably, the exposed portion of the internal liner 6 allows a person's lower lip to contact the internal liner 6 without contacting the external housing 4. In addition, the upper portion 30 can have a thickness $T_1$ of from about 1 mm to about 5 mm, and preferably about 2 mm. The invention, however, is not limited to the dimensions of the upper portion 30 described above and includes other dimensions appropriate for a configuration and/or size of the container system 1.

The internal liner 6 is disposed within the external housing 4 such that a portion of the internal liner 6 is attached to a portion of the external housing 4. The internal liner 6 is maintained within the external housing 6 by means such as an adhesive or a bonding material, a mechanical fastener or tension fit.

The internal liner 6 has a tapered interior configuration. An interior diameter $D_2$ of the internal liner 6 decreases from top to bottom (although not necessarily monotonically as shown). The external housing 4 also has a tapered interior configuration with an interior diameter $D_3$ that decreases from its top towards its bottom 78 (although not necessarily monotonically). An external diameter $D_5$ of the internal liner 6 is more tapered than the interior diameter $D_3$ of the external housing 6 such that a cavity 88 is defined between an inside surface 92 of the external housing 4 and an outside surface 96 of the internal liner 6. The cavity 88 can be filled with air or filler such as an impact-absorbing material. The air or material within the cavity 88 helps to cushion the outside surface 96 of the internal liner 6 to thereby reduce force on the liner 6, e.g., resulting from dropping the container body 2 on a surface.

The internal liner 6 can be constructed of one or more ceramics suitable for helping to reduce or eliminate chemical or other interaction between the internal liner 6 and its contents. In a preferred embodiment, the internal liner 6 is constructed of a crystalline ceramic.

Other preferable materials for the internal liner provide capabilities such as substantial chemical inertness and enhanced thermoinsulation. Substantially chemically inert materials provide a substantially imperceptible effect on the taste of the container's contents. Materials with enhanced thermoinsulation inhibit a change in the temperature of the contents over a reasonable period of time. Preferably, materials with enhanced thermoinsulation can substantially maintain the temperature of the contents for at least about thirty minutes. Substantially maintaining the temperature of the contents means impeding a change in temperature that would render the contents undesirable to a consumer.

The internal liner 6 is disposed within the external housing 4. Referring to FIG. 1, the external housing 4 has an outer rim 80 and provides a reservoir 84. The reservoir 84 defines a volume sufficient to permit the internal liner 6 to contain a required or desired volume of contents. The outer rim 80 has an interior diameter $D_4$ sized such that the external housing 4 will accept the internal liner 6.

The external housing 4 can be constructed of any durable material suitable for helping to prevent damage to the internal liner 6 including, but not limited to, metal, plastic, rubber and any combinations of such materials. The external housing 4 can also be constructed to include a decorative feature, such as, for instance, a lattice or other pattern, such that a portion of the internal liner 6 can be exposed.

As shown, the container body 2 includes a handle 10 disposed along the external housing 4. The handle 10 is securely attached or joined to the external housing 4 by means such as an adhesive or a bonding material, or a mechanical faster, such that the handle 10 can be used to lift and manipulate the container body 2 during use. Suitable materials for the handle 10 include, but are not limited to, metal, plastic, rubber and combinations of such materials. The handle 10 can contain additional material to ensure a user's grip along the handle 10 including, but not limited to, a texturized metal, plastic or rubber or a plastic, rubberized, or polymer coating. The handle 10 can be constructed of the same material as the external housing 4 and may be integrally formed with the housing 4. The handle 10 has a shape and size suitable for lifting and manipulating the container body 2 by a person's hand, or several fingers of the person's hand.

Figure 2:
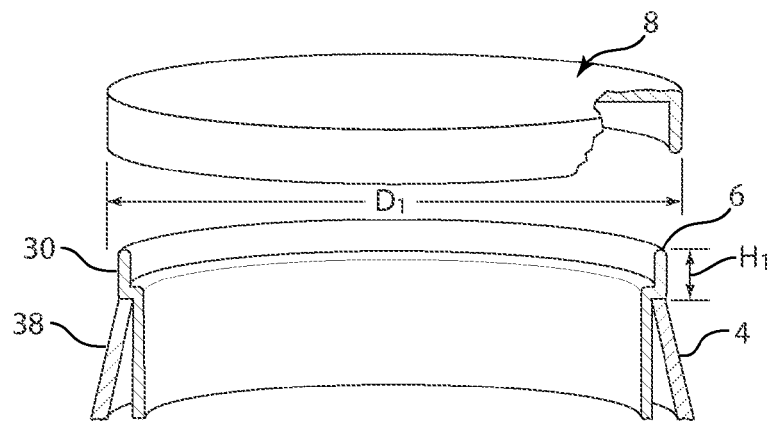
FIG. 2 is a perspective view of a portion of a container and lid of the system shown in FIG. 1.
Figure 3:
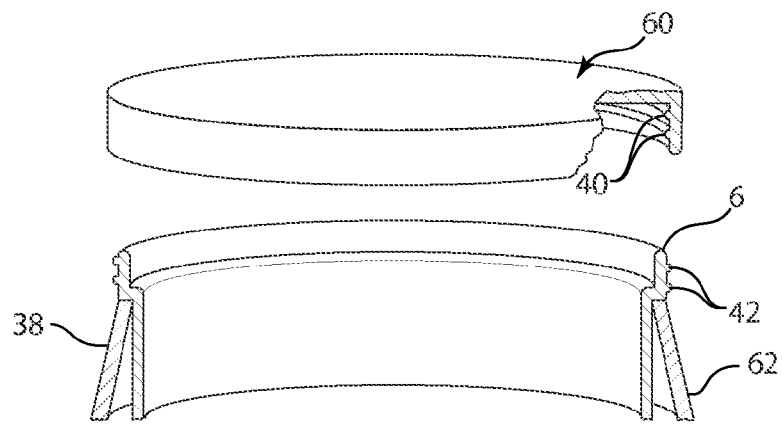
FIG. 3 is a perspective view of a portion of an alternative container and alternative lid.

The system 1 can also include a lid 8. Referring to FIGS. 2 and 3, with FIG. 3 showing an alternative lid 60 and alternative external housing 62, the lid 8, 60 is configured to attach to the housing 4, 62 by means such as a friction fit (lid 8) or a screw fit (lid 60). As shown in FIG. 2, the lid 8 is circular having a diameter $D_1$. The lid 8 receives an upper portion 30 of the internal liner 6 and/or an upper portion 38 of the external housing 4 and mates with the upper portion(s) 30, 38 to securely yet releasably connect to the container body 2. Other shapes (e.g., oval, square, etc.) are acceptable for the lid 8 and upper portions 38, 30 of the body 2. Alternatively, as shown in FIG. 3, the lid 60 can include one or more threads 40 on an inner surface of the lid 60. The threads 40 are disposed and configured to mate with one or more complementary threads 42 defined in an upper portion 38 of the external housing 62 to securely yet releasably attach the lid 60 to the housing 62 with a screw fit.

The lid 8, 60 can be constructed of one or more of the same materials used to construct the external housing 4, 62. Alternatively, the lid 8, 60 can be constructed of one or more of the materials used to construct the external housing 4, 62 and/or of one or more other materials that can provide specific properties to the lid 8, 60 such as glass or a translucent plastic. For instance, the lid 8, 60 can be constructed of a metal, plastic, rubber or any combination of such materials similar to the external housing 4, 62 and can further include, for instance, a window-like area constructed in whole or in part of glass or a translucent plastic that enables a user to view contents within the container body.

Figure 4:
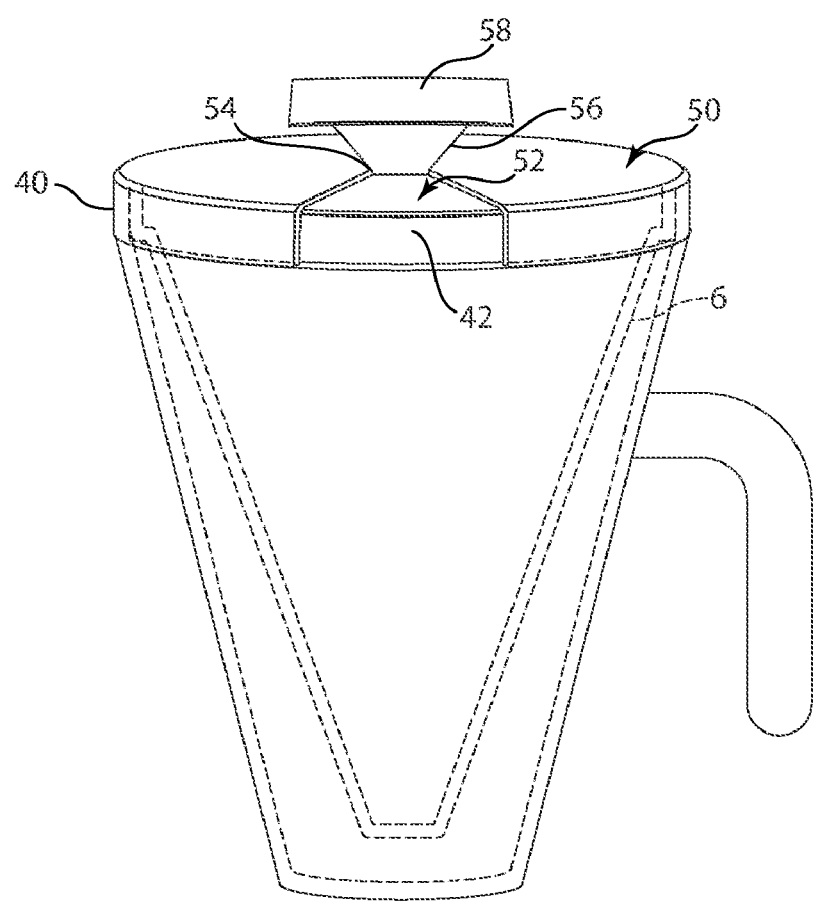
FIG. 4 is a perspective view of a container body with a lid providing an aperture and a foldable tab.

Lids may provide one or more apertures. Referring to FIG. 4, a lid 50 is configured to define an aperture 52 in a top surface 54 of the lid 50 with the aperture being disposed and configured to allow release of contents of the container body 2. The aperture 52 can be further configured to help to reduce splashing of contents as they flow from the container body 2. The aperture 52 can have any of various shapes, e.g., an ellipse, a rectangle with rounded corners, etc.

The lid 50 includes a foldable tab 56 attached to a top surface 54 of a lid 50 such that the tab 56 can pivot about a point of attachment to the top surface 54. The foldable or movable tab 56 can include a portion 58 of the side 40 of the lid 50. When the tab 56 is pivoted to permit the release of the contents of the container, a portion 42 of the internal liner 6 is exposed, allowing a person to contact the liner 6. Other forms of tabs and/or movements (e.g., rotation) of tabs are acceptable, as well as no tab at all.

The container system 1 can have a variety of configurations and sizes. Preferably, the container body 2 has a shape, which provides a substantial volume defined by the internal liner 6 while providing a base that mates with holders such as a car cup holder. For example, a frustoconical container body oriented with the narrower end as the base provides a larger volume reservoir relative to a conical container body of the same height and base diameter.

Figure 5:
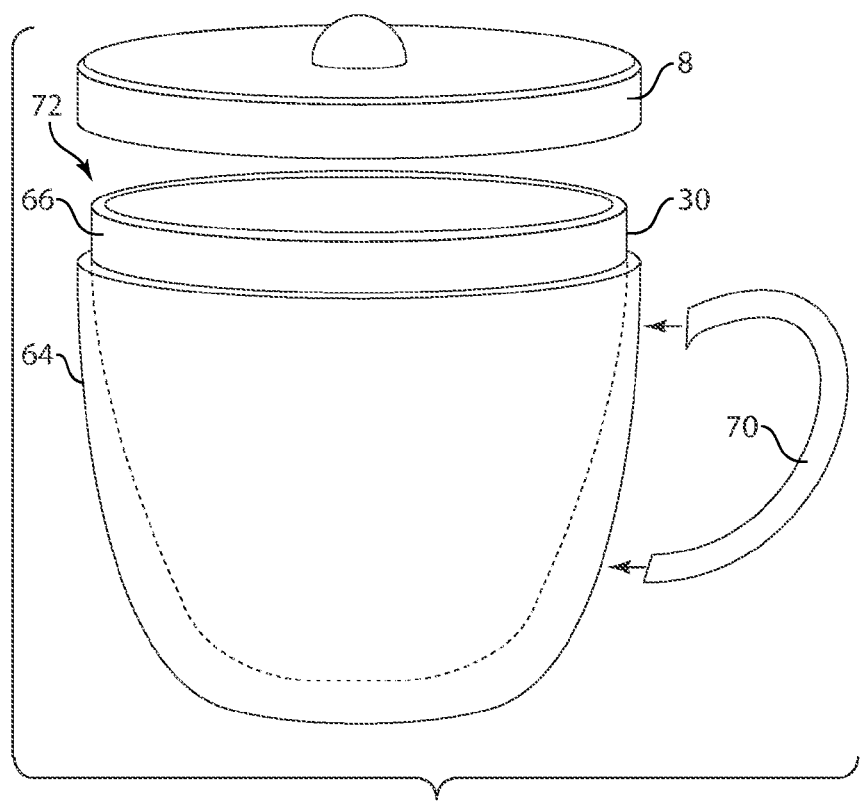
FIG. 5 is a perspective view of cup according to the invention.
Figure 6:
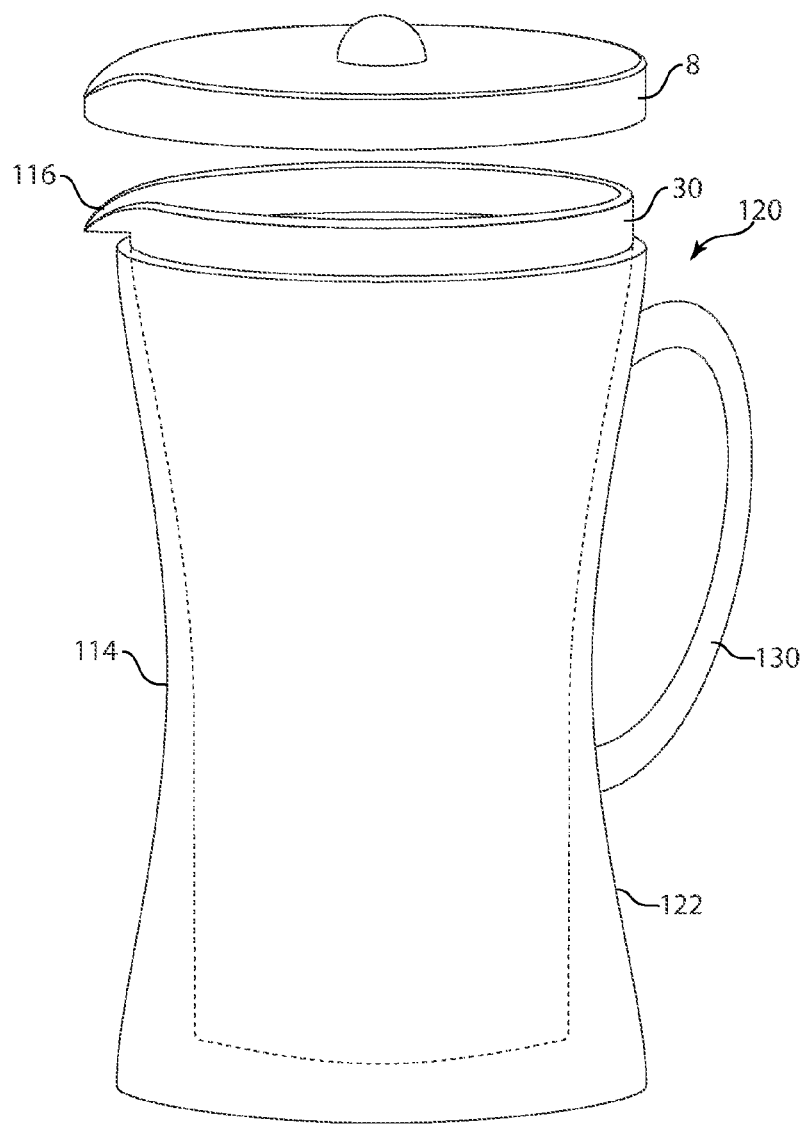
FIG. 6 is a perspective view of a carafe according to the invention.

Referring to FIGS. 5 and 6, container bodies can have other sizes and configurations than as shown and described above. As shown in FIG. 5, an external housing 64 and an internal liner 66 is configured to form a container body 72, in a form of a cup with a handle 70, e.g., a coffee cup, or without the handle 70, e.g., a latte cup. In addition, as shown in FIG. 6, an external housing 114 and an internal liner 116 can be configured to form a container body 122 to hold a relatively large volume of contents, e.g., an insulated pitcher or carafe 120.

Further, the dimensions and configuration of the lids are not limited to those as disclosed with reference to FIG. 1 and FIGS. 2-4. The lids can be sized and configured such that the lid 8 receives and mates with the upper portion of the internal liner where the container body defines a cup, as shown in FIG. 5, or the container body defines a pitcher or carafe, as shown in FIG. 6.

Figure 7:
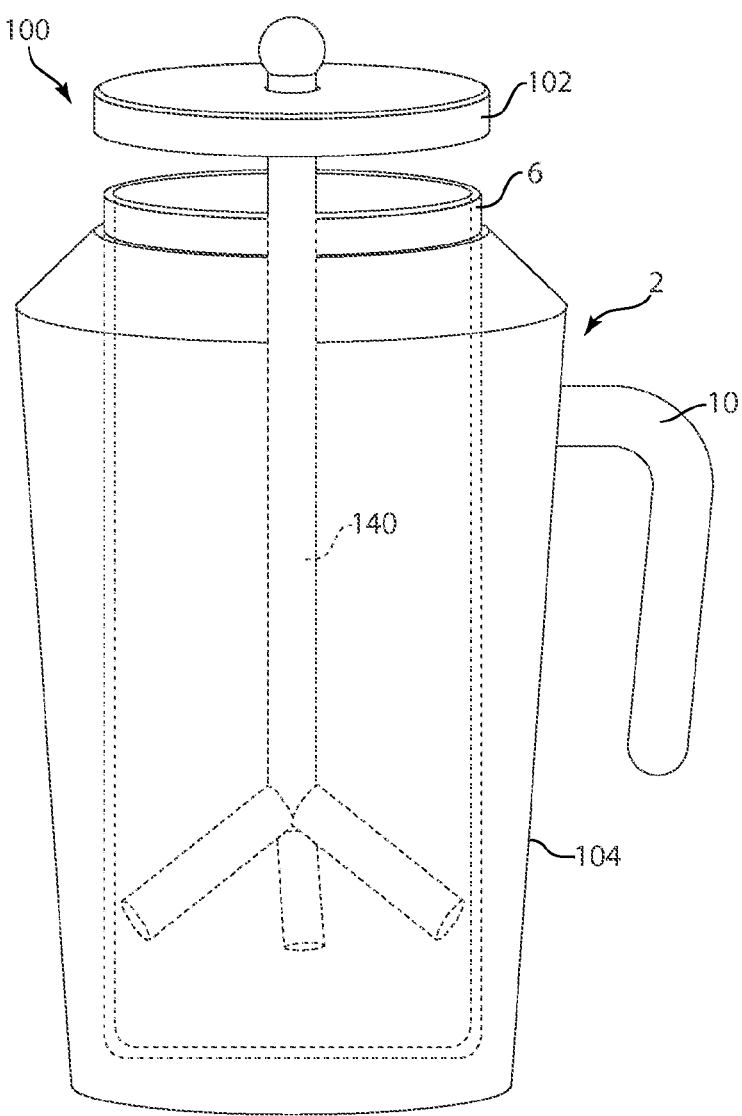
FIG. 7 is a perspective view of a container system according to the invention that includes a French press.

Other embodiments are within the scope of the invention. For example, referring to FIG. 7, container system 100 can be configured as a portable beverage container with a removable French press 140. A user of the system 100 can prepare coffee in the system 100 using the French press 140 and then remove the press 140 and affix a lid 102 to a container body 104 to convert the system 100 into a portable beverage container.

What is claimed is:

1. A portable beverage container system comprising:
    a container body including:
        an external housing having an inner surface and an outer surface and constructed of a durable metal material, wherein the external housing defines an open-ended housing cavity, and wherein the external housing is tapered such that the interior diameter decreases in a direction from a top of the external housing towards a bottom of the external housing;
        an internal liner having an inner surface and an outer surface and constructed of a crystalline ceramic material, wherein the internal liner defines an open-ended liner cavity, and wherein the internal liner is tapered such that the exterior diameter decreases along an entire length of the internal liner in a direction from a top of the internal liner towards a bottom of the internal liner;
        wherein a portion of the internal liner is fixedly attached to the top of the external housing;
        wherein below said attachment, the exterior diameter of the internal liner is less than the internal diameter of the external housing such that a cavity is defined between an inside surface of the external housing and an outside surface of the internal liner;
        wherein the exterior diameter of the internal liner is more tapered than the internal diameter of the external housing along its entire length such that said defined cavity is larger at the bottom of said container system than at the top of said container system;
        wherein the internal liner is partially disposed in the open-ended housing cavity such that at least a portion of the internal liner extends above the external housing through the open-ended housing cavity; and
        wherein the internal liner is maintained within the external housing.

2. The portable container system of claim 1, wherein the internal liner extends above the external housing by a distance allowing a person's lips to contact the liner without contacting the external housing.

3. The portable container system of claim 1, wherein the crystalline ceramic material is porcelain.

4. A portable beverage container system comprising:
    a containing means for containing a liquid constructed of a crystalline ceramic material and defining an open-ended liner cavity, wherein the crystalline ceramic material provides enhanced thermoinsulation and is substantially chemically inert;
    a protecting means for protecting the containing means, wherein the protecting means comprises a durable metal material and defines an open-ended housing cavity; and
    a sealing means releasably coupled to the protecting means;
    wherein a portion of the containing means is fixedly attached to the top of the protecting means;
    wherein below said attachment, the exterior diameter of the containing means is less than the internal diameter of the protecting means such that a cavity is defined between an inside surface of the protecting means and an outside surface of the containing means;
    wherein the exterior diameter of the containing means is more tapered than the internal diameter of the protecting means along its entire length such that said defined cavity is larger at the bottom of said container system than at the top of said container system; and
    wherein the containing means is partially disposed in the protecting means such that at least a portion of the containing means extends above the protecting means such that the upper portion of said containing means and the upper portion of the protecting means can receive the sealing means;
    wherein the sealing means is a lid; and
    wherein the containing means is maintained within the protecting means.

5. A portable beverage container system comprising:
    a frustoconical container body including:
        an external housing of a durable metal material and defining an open-ended housing cavity,
        wherein the open-ended housing cavity is tapered such that it has a diameter that decreases in a direction from the top of the external housing towards the bottom of the external housing;
        an internal liner constructed of a crystalline ceramic material defining an open-ended liner cavity, wherein the open-ended liner cavity is tapered such that it has a diameter that decreases along the entire length of the internal liner in a direction from a top of the internal liner towards a bottom;
        wherein a portion of the internal liner is fixedly attached to the top portion of the external housing;
        wherein below said attachment, the exterior diameter of the internal liner is less than the internal diameter of the external housing such that a cavity is defined between an inside surface of the external housing and an outside surface of the internal liner;
        wherein the exterior diameter of the internal liner is more tapered than the internal diameter of the external housing along its entire length such that said defined cavity is larger at the bottom of said container system than at the top of said container system;

wherein the internal liner is partially disposed in the open-ended housing cavity such that at least a portion of the internal liner extends above the external housing through the open-ended housing cavity;

a lid releasably coupled to the upper portion of said internal liner and the upper portion of the external housing including:

an aperture; and a foldable tab coupled to the lid;

wherein the foldable tab optionally covers the aperture;

a handle coupled to the external housing; and wherein the internal liner is maintained within the external housing.

6. The portable beverage container system of claims 1, wherein said cavity is air-filled.

7. The portable beverage container system of claim 1, wherein said cavity contains an impact-absorbing material.

8. The portable beverage container system of claim 1, wherein said portable beverage container system is a beverage cup.

9. The portable beverage container system of claim 1, wherein said wherein the internal liner is permanently maintained within the external housing by an adhesive or bonding material.

10. The portable beverage container system of claim 4, wherein said portable beverage container system is a beverage cup.

11. The portable beverage container system of claim 4, wherein said wherein the internal liner is permanently maintained within the external housing by an adhesive or bonding material.

12. The portable beverage container system of claim 5, wherein said portable beverage container system is a beverage cup.

13. The portable beverage container system of claim 5, wherein said wherein the internal liner is permanently maintained within the external housing by an adhesive or bonding material.

* * * * *